Figure 1:
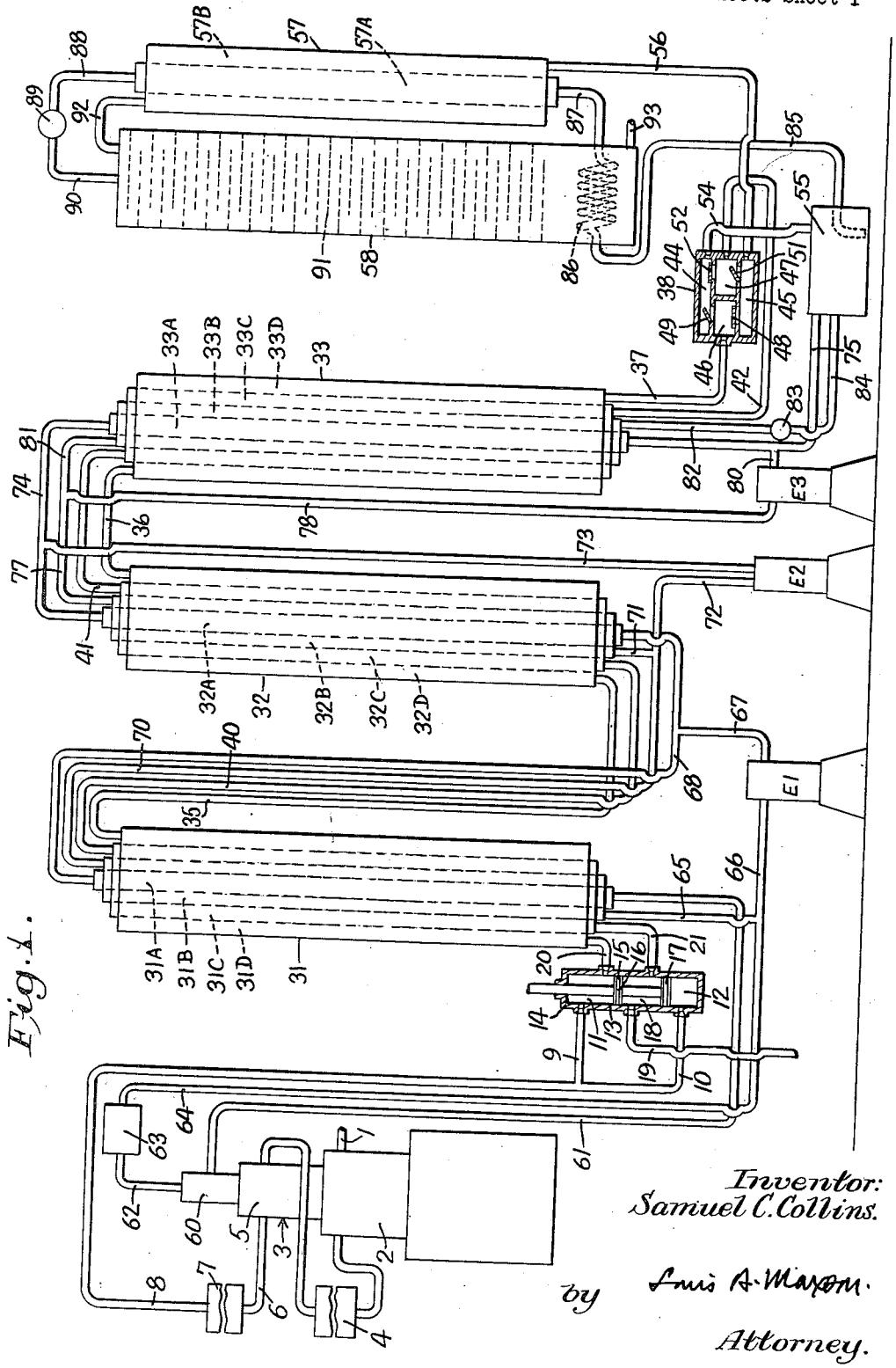

Jan. 26, 1954 S. C. COLLINS 2,667,043
METHOD AND APPARATUS FOR THE SEPARATION OF GASES
Filed April 22, 1950 3 Sheets-Sheet 3

Inventor.
Samuel C. Collins.

By Louis A. Maxson.
Attorney.

Patented Jan. 26, 1954

2,667,043

UNITED STATES PATENT OFFICE 2,667,043

METHOD AND APPARATUS FOR THE SEPARATION OF GASES

Samuel C. Collins, Watertown, Mass., assignor to Joy Manufacturing Company, Pittsburgh, Pa., a corporation of Pennsylvania Application April 22, 1950, Serial No. 157,610

21 Claims. (Cl. 62—123)

My invention relates to improvements in method and apparatus for the separation of gases.

It will be described particularly in its application to the production from air of oxygen of a high degree of purity, but it will be understood that this is but illustrative, because both the process and the apparatus can be used, with appropriate modifications, for the treatment of various gases to effect the separation of desired constituent products. Under some circumstances the desired product may be delivered at a relatively high pressure and under others at a pressure of a few atmospheres, but that may be said to depend on the pressure to which the product may be raised after its discharge from the rectification column, and herein the invention, since it relates peculiarly to the generation of the product, will be described in the illustrative forms chosen only as a method of and apparatus for generating liquid oxygen at column pressure, and in single column exemplifications.

In the separation of gases the problem of cooling or refrigeration is a major one, and in certain forms of oxygen generators, for example, a large portion of the air treated is cooled by passage through expansion engines or turbines on the way to the column. Another problem resides in the separation of moisture and carbon dioxide from the air, and when reversing heat exchangers are used, in order that the process may be carried on for long periods without need for shutting down the apparatus to clear out deposits of carbon dioxide, various procedures have been adopted, such as recirculation of a portion of the entering air through a separate course in the lower temperature portion of suitable reversing heat exchangers. The present invention has for objects the provision of improved methods of and apparatus for effecting the needed refrigeration and the effective separation of impurities such as water vapor and carbon dioxide without the necessity for relatively frequent shut-downs for the removal of such collections of solid carbon dioxide as interfere seriously with, if they do not indeed interrupt, the carrying on of the separation process.

In the preparation of liquid oxygen from atmospheric air the refrigeration required to keep the apparatus sufficiently cold for satisfactory operation is generally small compared with that necessary to cool the air from room temperature to its condensation temperature and to effect its condensation thereafter. It so happens that for air or oxygen the sensible heat removed while cooling from 300° K. to 100° K. is approximately equal to the heat of condensation, that is, 50 calories per gram. In other words, to convert a gram of gaseous oxygen at 300° K. to a gram of liquid oxygen at 100° K. there must be extracted approximately 100 calories of heat.

The work required to remove the heat depends in magnitude upon the manner in which it is applied. According to the second law of thermodynamics the minimum work necessary to extract an element of heat $dq$ from a body at temperature $T_2$ and discard the heat at a higher temperature $T_1$ (room temperature generally) is expressed by the relation $$W = dq \frac{(T_1 - T_2)}{T_2}$$

The greater the temperature difference, the greater the required work, and the smaller $T_2$ the greater the required work. To extract one calorie of heat from a body of air at 299° K. and discard it at 300° K. the work (if the machinery were perfect) equals $$1 \frac{(300° - 299°)}{299°} \text{ cal.} = \frac{1}{299} \text{ cal.}$$

On the other hand, to extract one calorie from a body of air at 100° K. and discard it at 300° K., the required work, on the same assumption as to the machinery, would equal $$1 \frac{(300° - 100°)}{100°} \text{ cal.} = 2 \text{ cal.}$$

—almost 600 times as much.

In liquefying air or oxygen by the removal of approximately $$100 \frac{\text{cal.}}{\text{gram}}$$

it is possible to provide adequate refrigeration at 100° K., to absorb the entire amount at this level. Or it is possible to establish several temperature levels of refrigeration. For instance, at 210° K., as hereinafter more fully explained, the air might be caused to give up $$22 \frac{\text{cal.}}{\text{gram}}$$

at 150° K. an additional $$15 \frac{\text{cal.}}{\text{gram}}$$

might be extracted, and at 100° K. the remaining $$63 \frac{\text{cal.}}{\text{gram}}$$

might be separated. If the refrigeration is supplied as cold air (expansion engine exhaust) it can be brought into heat exchange relation with the gas to be liquefied in a counterflow heat exchanger in such a manner that all of the sensible heat of the gas may flow into the expanded air across a very small interval of temperature, thus providing the effect of having an infinite number of refrigerating levels, temperature-wise, and improving the efficiency still more.

According to this invention, in one embodiment thereof, in accordance with the principles above explained, the heat exchanger for cooling and at least partially liquefying the entering gaseous stream, is broken up into a plurality of sections, and each is served by the cold exhaust of an expansion engine, and the temperature drops across the individual expansion engines will be made substantially identical with the temperature drops across the heat exchanger sections which they severally bracket or embrace. According to another embodiment, there may be provided a special cooling circuit for the purified air which is utilized to provide supplemental cooling in the reversing heat exchangers, and the air in this circuit may be cooled in a plurality of serially arranged heat exchangers each served by the cold exhaust of an expansion engine and the temperature drop across the individual expansion engines will be made substantially identical with the temperature drops across the heat exchanger sections which they severally bracket or embrace. In a preferred form of this general arrangement there may be a reduction in the mass flow of the cooling air in the reversing exchangers when the conditions warrant this.

To take fuller advantage of the principle of extracting heat at the highest temperature level possible, a third and higher stage of compression is also added. This has two effects. With higher pressures, the specific heat of the gas is increased, with a consequent reduction of the heat of condensation, and, moreover, the temperature at which condensation occurs is substantially raised. For instance, at one atmosphere air condenses at approximately 80° K., while at 30 atmospheres, the condensation temperature is 127° K.

By causing each of the expansion engines to receive air at an elevated pressure, as 30 atmospheres, and to discharge it at a much lower pressure, as at 5 atmospheres, the courses in the heat exchangers which carry the two streams can be rather restricted without entailing excessive power losses, and the high turbulence which results renders the heat transfer coefficient high. Therefore, the heat exchangers can be considerably smaller than they would be if they were traversed by the same weight of air at lower pressures yielding the same amount of refrigeration.

Figure 2:
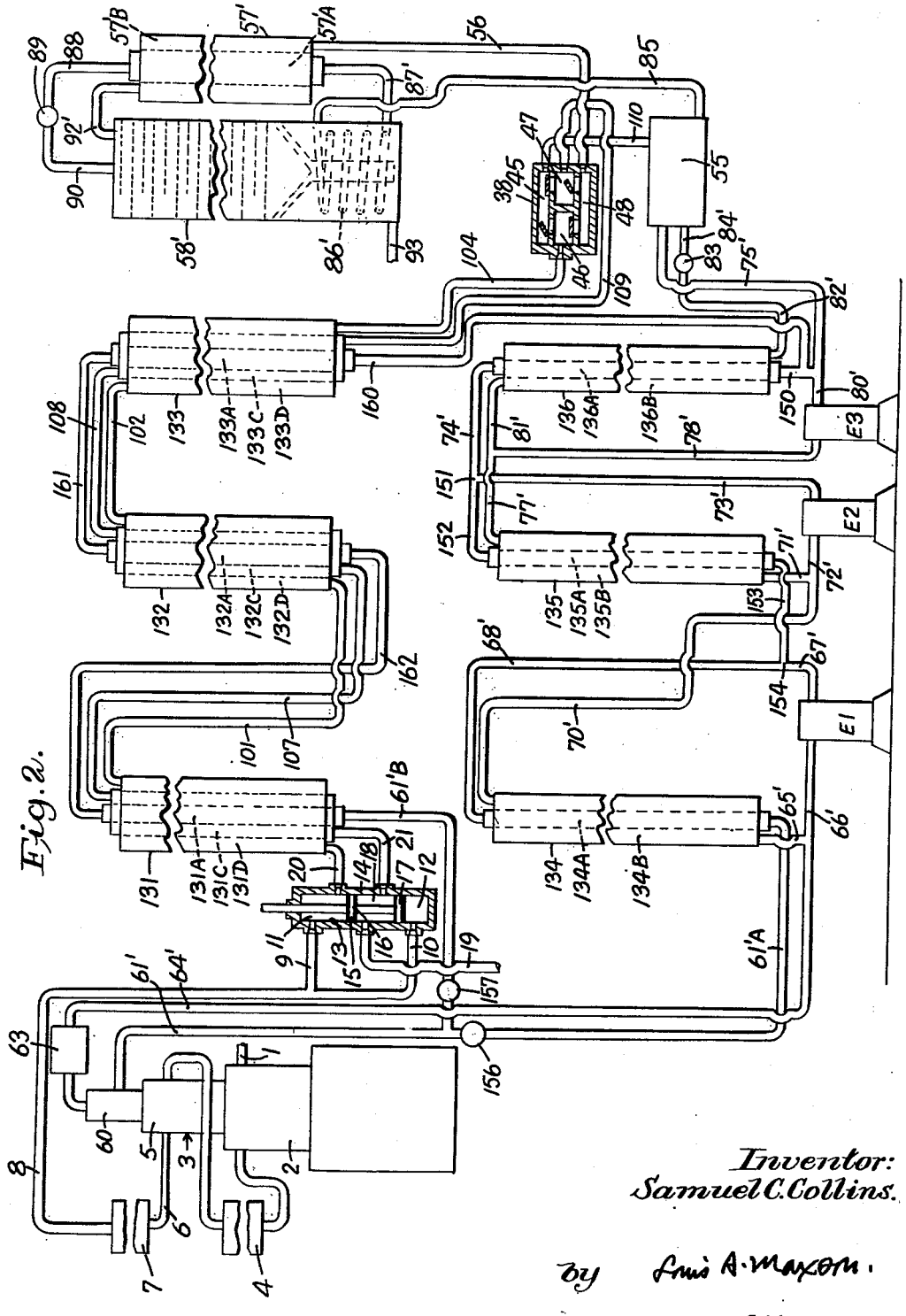
Figure 3:
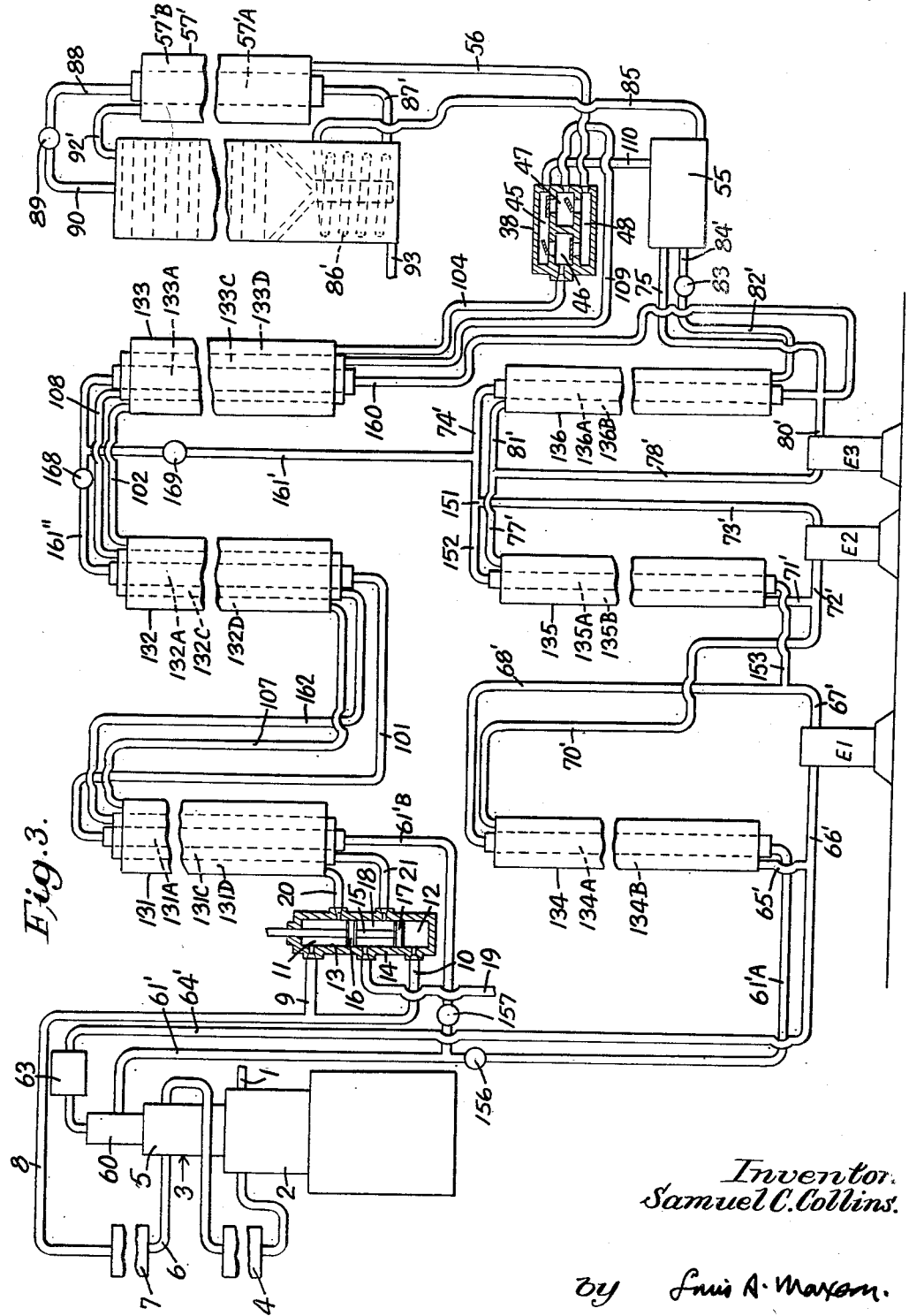

In the accompanying drawings, in which three illustrative embodiments of the invention from its apparatus aspect, and three structures by which the invention may be practiced from its method aspect have been shown, Fig. 1 is a diagrammatic view showing an oxygen generating system in which one embodiment of the invention from its apparatus aspect is disclosed;

Fig. 2 is another diagrammatic view showing another embodiment in which there are employed a larger number of heat exchangers; and Fig. 3 is another diagrammatic view similar to Fig. 2, but showing a system in which the mass of air used in the cooling circuit is not uniform throughout the latter.

Referring first to the system shown in Fig. 1 of the drawings, air at atmospheric pressure is delivered through a conduit 1 to the first stage 2 of a compound compressor 3, and after passing through an intercooler 4 is delivered to the second stage 5 of that compressor and discharged by the latter through a conduit 6 to an aftercooler 7 from which the air passes at a pressure of about 5½ atmospheres (all pressures are absolute unless otherwise indicated) and at a temperature of about 300° K. to a conduit 8. This conduit has branches 9 and 10 which lead to spaces 11 and 12 respectively at the opposite ends of a valve chamber 13 formed in a valve casing 14, which contains a two-spool valve 15 having its spools 16 and 17 separated by an annular groove 18 which is of such length as to be incapable of connecting a conduit 19, which is connected with the valve chamber about midway between its length, simultaneously with another pair of conduits 20 and 21 which communicate with the valve chamber at spaced points at opposite sides of the center of the latter. The valve may be moved, however, as shown in Fig. 1 to connect the conduit 21 with the conduit 19, or to connect the conduit 20 with the conduit 19 when the valve is moved to its opposite position. When the conduit 20 is connected with the conduit 19, the conduit 21 is connected with the space 12 and the branch 10 of conduit 8. When conduit 21 is connected, as shown in Fig. 1, with the conduit 19, the conduit 20 is connected with the space 11 and the branch 9 of the conduit 8.

The conduit 19 is a discharge conduit and the effluent from the system (mainly nitrogen, when air is being separated) leaving the apparatus is adapted to be discharged through this conduit 19 to the atmosphere. The valve mechanism 14, 15 is of the mechanically actuated type and is periodically moved by power and with a snap action to reverse the connections of these conduits with the conduit 19. In the Samuel C. Collins application Serial No. 661,253, filed April 11, 1946, there is diagrammatically shown a reversing valve mechanism suitable for the performance of the functions of the valve mechanism 14, 15, and another mechanism suitable for this purpose forms the subject matter of an application of Win W. Paget, Serial No. 35,092, filed June 15, 1948. The power for shifting the valve mechanism to effect connection of the air supply conduit 8 now with the conduit 20 and again with the conduit 21, and connection of the conduit 19 with the conduits 21 and 20 while the conduit 8 is connected with the conduits 20 and 21, may be taken from any suitable source, but may be desirably taken from the drive shaft of an expansion engine through connections not shown and through any necessary reduction gearing to provide the proper timing for the reversals of position of the valve 15. Reversals are adapted to be effected at relatively short intervals, and suitable intervals may be on the order of three minutes, but it will be understood that this is but an example and is not limiting.

The system includes three reversing heat exchangers 31, 32 and 33, and one other heat exchanger, 57, later described. These are desirably vertically disposed and formed as separate units, to maintain the overall height of the system within reasonable limits. Entering air passes through the heat exchangers 31, 32 and 33 in the order mentioned, while leaving nitrogen passes through these same heat exchangers in the order 33, 32, 31. Each of these heat exchangers, in the arrangement of Fig. 1, has four courses, shown for the purposes of illustration as coaxial courses, and the several courses are indicated, starting with the central course in the case of exchanger 31, as 31A, 31B, 31C and 31D. Similarly, exchanger 32 has courses 32A, 32B, 32C and 32D; and exchanger 33 has courses 33A, 33B, 33C and 33D. Through two of the courses in series of each of the exchangers, to wit, those designated 31C, 32C and 33C and 31D, 32D and 33D, the entering air and the leaving nitrogen flow alternately, entering air flowing inwardly through one of these series of courses and the nitrogen flowing outwardly through the series which is not at any given moment serving for the inflow of air. The other two courses of each of the three exchangers 31, 32 and 33 will be later described. It will be appreciated that while coaxial arrangements of the courses have been shown for purposes of illustration, any other suitable arrangement of multipass exchangers may be employed. Conduit 20 communicates with course 31D of heat exchanger 31, and this course is connected at its top by a conduit 35 with the bottom of course 32D of exchanger 32. The top of course 32D is connected by a conduit 36 with the top of course 33D of exchanger 33; and the bottom of the last mentioned course is connected by a conduit 37 with a supplemental reversing valve mechanism 38, whose structure will shortly be described in some detail. The conduit 21 communicates with the bottom of course 31C of exchanger 31, and the top of that course is connected by a conduit 40 with the bottom of course 32C of exchanger 32. The top of course 32C is connected by a conduit 41 with the top of course 33C of exchanger 33, and the bottom of course 33C is connected by a conduit 42 with the reversing valve mechanism 38.

The reversing valve mechanism 38 is more or less diagrammatically shown, and is illustrated as having a full length top chamber 44, a full length bottom chamber 45 and two half length intermediate chambers 46 and 47. Conduit 37 leads to chamber 46. Chamber 46 is connectible through upwardly opening check valves 48 and 49 with the chambers 45 and 44. Fluid can flow from chamber 45 into chamber 46 past the check valve 48, but not reversely, and fluid can flow from chamber 46 into chamber 44 past the check valve 49, but not reversely. Thus fluid can flow from the conduit 37 into the chamber 44, and fluid can flow out of the chamber 45 to the conduit 37. Conduit 42 connects with chamber 47. The chamber 47 may communicate past check valves 51 and 52 respectively with chambers 45 and 44, the check valve 51 permitting flow of fluid from the chamber 45 to the chamber 47, but not reverse flow; and flow of fluid from the chamber 47 to the chamber 44 is permitted by the check valve 52, but reverse flow is prevented. As a result of this construction fluid may flow from chamber 45 to conduit 42 or from conduit 42 to chamber 44, but not reversely. Chamber 44 is connected by a conduit 54 with a separator chamber 55, and chamber 45 is connected by a conduit 56 with a fourth heat exchanger 57, whose functions will later be described. At this point it may well be noted, however, that the conduit 56 is at all times an exhaust conduit for nitrogen efflux from the column 58, which forms a portion of the apparatus, and that conduit 54 is at all times a delivery conduit for conducting air to the separator chamber 55.

The flow of entering air and leaving nitrogen may now conveniently be traced to the following extent. Entering air, with the valve 15 in the position shown, passes from conduit 8 through branch 9, space 11, conduit 20, course 31D, conduit 35, course 32D, conduit 36, course 33D, conduit 37, chamber 46, chamber 44, and conduit 54, into chamber 55. It may be noted at this point that the entering air has been purified of the condensible constituents, water vapor and carbon dioxide, and is saturated, but substantially all in gaseous form, at the time it reaches the chamber 55. Concurrently with this flow of entering air, nitrogen efflux passes from conduit 56 through chamber 45, chamber 47, conduit 42, course 33C, conduit 41, course 32C, conduit 40, course 31C, conduit 21, groove 18 and conduit 19, to atmosphere.

The compressor includes a high pressure portion 60 which is arranged, as shown, in tandem with the stages 2 and 3, but it does not constitute a third stage of the compressor in that it does not take in air directly from the stage 5 of the compressor 3, but instead takes in air in a manner which will shortly be explained. It can be a separate unit, if desired. This portion 60 of the compressor receives air through a conduit 61 and discharges it through a conduit 62, and air enters the compressor portion 60 at on the order of 5 atmospheres absolute and is delivered through an aftercooler 63, which may be of any suitable construction, to a conduit 64 at a pressure of about 30 atmospheres absolute. These pressures are but illustrative of those desirable with an apparatus such as is illustrated. Conduit 64 branches, and one branch, 65, enters the bottom of course 31B of exchanger 31 while the other branch, 66, goes to an expansion engine E-1, where the air which is handled by this expansion engine is expanded from a pressure of 30 atmospheres to 5 atmospheres. The air leaves the expansion engine E-1 by a conduit 67 which joins a conduit 68, which connects the course 32A of exchanger 32 with the course 31A of exchanger 31. At this time it may be convenient to note that the lower end of the course 31A communicates with the conduit 61. It has been noted that the conduit 65 communicates with the bottom of course 31B of exchanger 31, and the top of that course is connected to a conduit 70 which branches, one branch thereof, 71, entering the bottom of course 32B and the other branch thereof, 72, connected to an expansion engine E-2, in which the air which enters the expansion engine E-2 is expanded from a pressure of 30 atmospheres to a pressure of 5 atmospheres. Air leaving the expansion engine E-2 at a pressure of 5 atmospheres passes through a conduit 73 and joins a conduit 74 which connects the course 33A of the exchanger 33 with the course 32A of exchanger 32.

It may now be noted, in passing, that a conduit 75 connects the chamber 55 with the bottom of the central course 33A and the portion of the air at 30 atmospheres which passes by way of conduit 71 into course 32B flows from the top of that course to a conduit 77. Conduit 77 branches, and one branch, 78, thereof passes to an expansion engine E-3 in which the portion of the air passing through this expansion engine is expanded to a pressure of 5 atmospheres. Air leaving the expansion engine E-3 passes to a conduit 80 which opens into the conduit 75. The other branch, 81, of the conduit 77 communicates with the top of course 33B of exchanger 33, and the bottom of course 33B is connected by a conduit 82 with an expansion valve 83, which reduces the pressure to, say, 5½ atmospheres and of which the low pressure side is connected by a conduit 84 with the chamber 55. The power produced by the several expansion engines may be used for any desired purpose, such as aiding in the drive of the compressor devices.

Before describing the pressures and temperatures at various points throughout the system and otherwise explaining its operation, it may be well to note that a conduit 85 leads from the bottom of the chamber 55 to a boiler-condenser coil 86 in the bottom of the column 58, and that this coil at its other end is connected with a conduit 87 which opens into the central course 57A of the fourth heat exchanger 57. A conduit 88 connects the top of course 57A with a pressure reducing valve 89 whose low pressure side is connected by a conduit 90 with the top of the column 58, which is herein shown for illustration as a packed column and of which the packing is indicated at 91. Nitrogen effluent leaves the top of the column 58 through a conduit 92 which enters the top of the outer course (as shown) 57B of exchanger 57, and the leaving nitrogen effluent flows from the bottom of the course 57B to the conduit 56, previously mentioned.

The expansion valve 83, as above noted, reduces the pressure of the gaseous stream which enters it through the conduit 82 at 30 atmospheres, to about 5½ atmospheres. The valve 89 is a pressure regulating valve and reduces the pressure within the conduit 88 of about 5½ atmospheres, to about 1½ atmospheres. Valve 83 may be manually controlled or may be made sensitive to purity or temperature or pressure.

Liquid oxygen product will leave the bottom of the column 58 through a conduit 93 under the control of a valve of the automatic float type (not illustrated) arranged to maintain a constant level in the boiler at the bottom of the column.

It will be understood that the entering air will contain some water vapor and carbon dioxide. These impurities will be separated out on the walls of the heat exchanger courses in exchangers 31 and 32 through which the entering air passes. When the reversing valve 15 changes its position, the nitrogen effluent will carry out carbon dioxide snow and the ice and water from the course through which the leaving nitrogen effluent passes outwardly.

One important matter to note—and it has been mentioned before—is that the temperature reduction in each of the expansion engines is substantially the same as the temperature reduction effected in the entering raw air stream which the expansion engines severally bracket.

The entering air, cooled and purified by its passage through the courses 31D, 32D and 33D or 31C, 32C and 33C, enters the chamber 55 through the conduit 54, and the air entering this chamber 55 divides, a portion of it returning by the conduit 75, course 33A, conduit 74, course 32A, conduit 68, course 31A and conduit 61, to the compressor portion 60, where it is compressed again to about 30 atmospheres. The remainder of the air which enters the chamber 55 is processed in the column. The air leaving the compressor portion 60 by the conduit 62 will be understood to be purified air, and it flows through the conduit 64 to the branch conduits 65 and 66. About 21 per cent of the air from compressor portion 60 passes to the expansion engine E–1, which it leaves at a pressure of 5 atmospheres and at a temperature of 210° K., while 79 per cent passes through the conduit 65 to course 31B of exchanger 31. From course 31B this 79 per cent passes to the conduit 70 at a temperature on the order of 215° K., and 26.8 per cent of the original volume of air discharged by the compressor portion 60 passes to the expansion engine E–2, from which it is exhausted at a pressure of 5 atmospheres and a temperature of 150° K., while 52.2 per cent of the original mass of air from compressor portion 60 goes by way of the conduit 71 to course 32B of exchanger 32. This air is cooled in exchanger 32 to about 155° K. as compared with the temperature of about 215° K. at which the air left the course 31B of exchanger 31. 40 per cent of the mass of air leaving the compressor portion 60 passes through the conduit 78 to the expansion engine E–3 and leaves the latter at a temperature of 103° K., as compared with the temperature of 108° K. of the other 12.2 per cent which leaves exchanger 33 after passing through course 33B. This remainder of the air which leaves the compressor portion 60 (12.2 per cent) goes by way of the conduit 81 into the course 33B and passes from that course by a conduit 82 to the expansion valve 83. This 12.2 per cent is completely condensed in exchanger course 33B, and the liquid air passes through the expansion valve, which reduces the pressure to about 5½ atmospheres, into the chamber 55. This liquid air, together with a large fraction of the purified air which enters the chamber 55 through the conduit 54 passes to the condenser 86 in the base of the column, where any uncondensed air is liquefied. The total liquid stream is then subcooled in exchanger 57 by the nitrogen waste before delivery to the column, which it enters at the pressure of 1½ atmospheres after passing through the pressure reducing valve 89. Purified air passes from the chamber 55 to the conduit 75, the amount being about the same as the amount which passes through exchanger course 33B and is liquefied in the latter. This air, which we may call makeup air for the purified air circuit in which the compressor portion 60 is arranged, will be noted to be joined before it reaches the course 33A through the conduit 75, by the exhaust of expansion engine E–3. The air passing from the top of exchanger course 33A by way of conduit 74 is joined before it reaches course 32A of exchanger 32 by the exhaust of expansion engine E–2, and the air leaving the bottom of exchanger course 32A by conduit 68 is joined by the exhaust of the expansion engine E–1 flowing through the conduit 67. The cumulative stream of air passing through the conduit 68 passes through course 31A of exchanger 31 and through conduit 61 back to the intake of the compressor portion 60. It will be observed that this outflowing stream is progressively warmed in the heat exchangers 33, 32 and 31 and enters the compressor portion 60 at substantially room temperature. It may be noted that the entering raw air stream passing through one or the other of the C or D courses of exchangers 31, 32 and 33 leaves these exchangers at the following respective temperatures:

From exchanger 31 at 215° K.,
From exchanger 32 at 155° K., and
From exchanger 33 at 108° K.

The operation of the method and apparatus as so far described in one illustrative form may now be summarized.

Air at a temperature of 300° K. and a pressure of 5½ atmospheres absolute is delivered by the two stage compressor 5 and aftercooler 7 to the conduit 8. It is passed, under the control of the valve 15, now for a period through the D-marked courses of the heat exchangers 31, 32 and 33, and then for a period through the C-marked courses of these heat exchangers. Moisture is substantially all removed by the time the air stream leaves exchanger 31, $CO_2$ all removed by the time the stream leaves exchanger 32, and the purified air is saturated but substantially all in gaseous form, at the time it leaves exchanger 33 through the one or the other of the conduits 37 and 42. Regardless of which of these conduits is the path of delivery of the entering air stream, the air is delivered, after passage through the reversing valve mechanism 38, by conduit 54 to chamber 55, where it is mixed with the 12.2 per cent of the purified air which passes via conduit 82 and past the pressure reducing valve 33, at a pressure of on the order of 5½ atmospheres into chamber 55. From the chamber 55, via the conduit 85, the same mass per minute of the mixture from the chamber 55, as the raw air pumped into the apparatus by the compressor 3 passes into the condenser coil 86, and, after condensation, passes through conduit 87, course 57A of exchanger 57, conduit 88, pressure reducing valve 89 (which reduces the pressure to 1½ atmosphere) and conduit 90 to the top of the column 58, in which rectification takes place; and the products of rectification, liquid oxygen, and nitrogen of 90–93 per cent purity, leave the column through the conduits 93 and 92 respectively. With the subsequent treatment and use of the liquid oxygen the present invention is not concerned. The nitrogen effluent, after passing, in counterflow relation to the oxygen in course 57A of exchanger 57, through the course 57B of that exchanger, passes through the conduit 56 to the reversing valve mechanism 38, and is delivered by the latter for alternate periods to the C or D courses of exchangers 33, 32, and 31, whichever is not the path, during any given period, of the entering air stream. It may be noted that the terms leaving nitrogen and nitrogen effluent are both from time to time used to designate the 90–93 per cent nitrogen which leaves the top of the column.

Certain facts as to quantities of air—masses thereof—flowing may now be observed, it being understood that the figures to be given are but illustrative. Assume that a mass of 143 pounds per minute of raw air enters the system at 1. This will be accompanied by some water vapor and carbon dioxide, but the illustrative figures need not be complicated by the small mass of these substances, which will be carried out of the system by the leaving nitrogen. A mass of 143 pounds per minute of purified air will be delivered to the chamber 55, which will also receive via conduit 84 20.7 pounds per minute from the pure air circuit. 143 pounds per minute of the mixture from chamber 55 will pass by conduit 85 to the column for rectification. A mass of 20.7 pounds per minute of the mixture will leave the chamber 55 by way of conduit 75 and be joined by a mass of 68 pounds per minute of the exhaust of expansion engine E–3. The combined mass, 88.7 pounds per minute will pass through course 33A and be joined by a mass of 45.6 pounds per minute at the junction of conduits 73 and 74, the last quantity constituting the exhaust from expansion engine E–2. The resultant mixture, of a mass of 134.3 pounds per minute will be joined in conduit 68, after having passed through course 32A, by a further mass of purified air of 35.7 pounds per minute, and the resultant mixture, of a mass of 170 pounds per minute, passes through course 31A and, via conduit 61 to the intake of compressor portion 60 where its pressure is increased to 30 atmospheres. It will be noted that this progressively increasing stream just disclosed is at a pressure of substantially 5 atmospheres at all points from conduit 75 to the intake of compressor portion 60. Two streams flow towards the column 58 through exchanger 31, one entering air and initially of a mass of 143 pounds per minute, and the other of purified air of a mass of 134.3 pounds per minute, the first at a pressure of 5½ atmospheres and the second at a pressure of 30 atmospheres, both entering this exchanger at 300° K. The exhaust from expansion engine E–1 is at a temperature of 210° K. and this exhaust, with the leaving stream of purified air at 5 atmospheres which it joins in conduit 68, plus the leaving nitrogen reduce the temperature of the entering air stream and the purified air in conduit 70 to on the order of 215° K., wherefore it will be clear that the temperature drop across the expansion engine E–1 is very close to the temperature drop across the exchanger 31, which it serves and brackets, and efficiency of heat transfer is improved.

In like manner it may be noted that fluid streams entering exchanger 32 leave the latter at on the order of 155° K. while the expansion engine E–2 which serves and brackets exchanger 32 reduces the temperature of the air which is expanded in it to on the order of 150° K.; and the expansion engine E–3 exhausts the fluid which passes through it at a temperature on the order of 103° K., just a little below the temperature 108° K. at which the fluid streams passing towards the column leave the exchanger 33. It will of course have been noted that the masses per minute of purified air of which the pressure is reduced in the expansion engines E–2 and E–3 and the expansion valve 83, cumulate the mass per minute which passes through conduit 65.

It will be clearly apparent that the apparatus so far described is constructed in accordance with the principles initially above outlined and operates in accordance with the improved method and provides the improved economy hereinabove mentioned.

The modifications of the invention disclosed in Figs. 2 and 3 are similar with one exception, so they may be described more or less together. In each, two heat exchanger systems are employed, in addition to the heat exchanger 57' between the boiler-condenser and the column. One of these two consists of a plurality of reversing heat exchangers having courses which serve alternately for an entering raw air stream and for the leaving nitrogen effluent, and also having a third course through which an auxiliary, refrigerating, purified air stream flows constantly in counterflow relation to the entering air and serves to supply the additional amount of cooling not provided by the leaving nitrogen. The other heat exchanger system comprises, as illustrated, three two-course exchangers each bracketed by an expansion engine, these heat exchangers and the expansion engines associated with them serving to extract enough heat from a purified air exchange system to enable the latter to provide the requisite refrigeration for the entering air system and liquefaction of a fraction of the air purified in the latter. The modifications of Figs. 2 and 3 differ in that somewhat more purified air is passed for refrigerating purposes through the last of the reversing heat exchangers in Fig. 3 than through the first two of these, speaking in terms of the direction of flow of entering air, the excess being returned to the purified air exchange system at a point where the temperature is substantially the same.

Referring now to Fig. 2, it will be seen that as in the embodiment of Fig. 1 air at atmospheric pressure is delivered through a conduit 1 to the first stage 2 of a compound compressor 3 and, after passing through an intercooler 4, is delivered to the second stage 5 of that compressor, and is discharged by the latter through a conduit 6 to an after-cooler 7 from which the air passes at a pressure of about 5½ atmospheres and at a temperature of about 300° K. to a conduit 8. As in the first embodiment, the conduit 8 has branches 9 and 10 which lead to spaces 11 and 12 respectively at the opposite ends of a valve chamber 13 formed in a valve casing 14, which contains a two-spool valve 15 having spools 16 and 17 separated by an annular groove 18, which is of such length as to be incapable of connecting a conduit 19, which is connected with the valve chamber about midway between its length, simultaneously with another pair of conduits 20 and 21 which communicate with the valve chamber at spaced points at opposite sides of the center of the latter. The valve may be moved to connect the conduit 21 with the conduit 19 or to connect the conduit 20 with the conduit 19 when the valve is moved to its opposite position. When the conduit 20 is connected with the conduit 19, the conduit 21 is connected with the space 12 and the branch 10 of conduit 8. When conduit 21 is connected, as shown in Fig. 2, with the conduit 19, the conduit 20 is connected with the space 11 and the branch 9 of the conduit 8.

The conduit 19 is a discharge conduit for the nitrogen effluent, and the valve of the mechanism 15 may be moved in the manner described with respect to the embodiment of Fig. 1.

Instead of being connected to the outside and next to the outside courses of a four-pass heat exchanger, as in Fig. 1 the conduits 20 and 21 are connected to the outside and to the intermediate courses of a three-course exchanger 131, conduit 20 connecting to the outside course 131D and conduit 21 connecting to the intermediate course 131C of the heat exchanger 131. The third course, 131A of this heat exchanger 131, is for the passage of pure air which constitutes a supplemental cooling medium for the entering air which passes alternately through the courses 131C and 131D. The flow through course 131A is unidirectional, and counterflow to the entering raw air.

Associated in the cooling, or heat exchanger system, for the entering air, with the exchanger 131 are two other three-course heat exchangers 132 and 133. Each of these has a central course designated with a capital A, an intermediate course designated with a capital C and an outer course designated with a capital D, and in each case the central course (133A and 132A) serves for the flow of cooled pure air, while in each case the courses 132C, 133C and the courses 132D and 133D serve in alternation for the inward flow of entering air and for the outward flow of nitrogen effluent. Conduit 20 enters course 131D at its bottom, and the top of course 131D is connected by a conduit 101 with the bottom of course 132D. The top of course 132D is connected by a conduit 102 with the top of course 133D of heat exchanger 133, and the bottom of the course 133D is connected by a conduit 104 with the chamber 46 of an automatic reversing valve mechanism 38 of the same construction as was described in connection with the first embodiment of the invention. The conduit 21 enters the bottom of course 131C of exchanger 131, and the top of course 131C is connected by a conduit 107 with the bottom of the course 132C of exchanger 132. The top of course 132C is connected by a conduit 108 with the course 133C of exchanger 133, and a conduit top of course 133C of exchanger 133, and a conduit 109 connects the bottom of course 133C with a chamber 47 in the automatic reversing valve 38. A separator chamber providing casing 55 of the same construction as that of embodiment 1 has a connection through a conduit 110 with the chamber 45 in the automatic reversing valve mechanism 38, and a bottom chamber 48 in the reversing valve mechanism 38 is connected by a conduit 56 with the bottom of an outer course 57′B of a heat exchanger 57′ of the two-course type. The top of the course 57′B is connected by a conduit 92′ with the top of a single column 58′. From the bottom of the separator a conduit 85 leads to the top of an evaporator-condenser coil 86′ in the bottom of the column 58′, and liquid oxygen is adapted to be led off from the evaporator-condenser chamber in the bottom of the column 58′ by way of a conduit 93, any suitable control for the outflow of the oxygen being provided. The other end of the coil 86′ is connected by a conduit 87′ with the central course 57′A of heat exchanger 57′; and this course at its top is connected by a conduit 88, an automatic pressure reducing valve 89 for reducing the pressure to the requisite degree for admission to the column (e. g. 1½ atmospheres), and a conduit 90, with the top of the column 58′.

As previously noted, the exchangers for effecting the cooling of the purified air prior to its admission to and passage through the three-course exchangers 133, 132 and 131 in series, consists of a plurality of two-course exchangers. These are numbered respectively, 134, 135 and 136 and each has a central course designated by a capital A and an outer course designated by a capital B. It is to be understood that the coaxial arrangement of the courses of the seven heat exchangers mentioned is not requisite and the exchangers 131, 132, 133, 134, 135, 136 and 57′ may be of any other suitable and desired form.

As in the embodiment of Fig. 1, the compressor 3 includes a high pressure portion 60 which is arranged as shown in tandem with the stages 2 and 3, but, again, it does not constitute a third stage of the compressor. This portion 60 of the compressor is adapted to receive air at 5 atmospheres pressure through a conduit 61′, and the air enters the compressor portion and is compressed therein to a pressure of 30 atmospheres absolute and is delivered through an after-cooler 63 to a conduit 64′. The conduit 64′ branches and one of its branches, 65′, enters the course 134B of exchanger 134 at the bottom. The top of the course 134B is connected with a conduit 70′ and this conduit also branches, and one of its branches, 71′, enters the bottom of course 135B of exchanger 135. From the top of this course a conduit 77′ leads off, and this conduit branches and one of its branches, 81′, enters the top of course 136B of heat exchanger 136, from the lower end of which there leads a conduit 82′ having a pressure regulating valve 83 therein, and the low pressure side of the pressure regulating valve is connected by a conduit 84′ to the separator chamber 55.

It has been noted that the conduit 64' branches, and that this is also true of conduits 70' and 77', and the connections of one of each of the branched conduits mentioned is above described. Turning now to the other branches, it will be noted that the other branch of the conduit 64', herein numbered 66', leads to the supply side of an expansion engine E-1, and the exhaust side of the expansion engine E-1 is connected with a conduit 67'. The other one of the branches of the conduit 70', herein numbered 72', leads to the supply side of an expansion engine E-2, from which an exhaust line 73' leads off. The branch 78' of the conduit 77' leads to the supply side of an expansion engine E-3, and from the exhaust side of the latter a conduit 80' leads off. From the separator-chamber 55 a conduit 75' extends. This conduit, and the exhaust conduit 80' from expansion engine E-3, join and are adapted to deliver fluid to a conduit 150, leading to the bottom of the course 136A of the exchanger 136. From the top of the course 136A a conduit 74' leads to a point of junction with the exhaust conduit 73' from the expansion engine E-2, and from this junction point 151 a conduit 152 leads to the top of course 135A of heat exchanger 135. From the bottom of course 135A a conduit 153 leads off, and this joins the exhaust conduit 67' from expansion engine E-1, and from the junction point of these conduits, 154, a conduit 68' leads to the upper end of the course 134A of heat exchanger 134. From the bottom of the course 134A a conduit 61'A extends and there may be a valve 156 provided in this conduit near the junction with it of a conduit 61'B later described. In like manner, the conduit 61'B may have an adjustable valve 157 arranged in it near the junction with the conduit 61'A. These valves will be understood to be provided so that there may be an adjustment of the quantity of fluid flowing through the conduits 61'A and 61'B relative to each other.

It may now be noted that the conduit 150 has communicating with it a conduit 160, extending from it to the lower end of the course 133A of the three-course exchanger 133. The upper end of course 133A is connected by a conduit 161 with the top of course 132A of exchanger 132. The bottom of the course 132A is connected by a conduit 162 with the top of course 131A of exchanger 131, the bottom of course 131A being connected by the conduit 61'B with the conduit 61'.

The following gas masses, temperatures and pressures will serve, by way of illustration, to facilitate an understanding of the operation of one particular size of apparatus of the character just described. Raw air may enter the apparatus at the rate of 143 pounds per minute. This will ordinarily be at atmospheric pressure. After passing through both of the stages of the compressor 3 this 143 pounds of air per minute, at a pressure of 5½ atmospheres, will be delivered to the line 8. Following passage through the aftercooler 7 its temperature may be on the order of 300° K. After passing through heat exchanger 131 the temperature will be on the order of 215° K. After passage through exchanger 132 the temperature will be on the order of 155° K., and after passage through exchanger 133 the temperature will be on the order of 103° K. This full mass of air less the slight weight of the water vapor and carbon dioxide separated from it, will be delivered through the conduit 110 to the separator 55 at a temperature on the order of 103° K. The high pressure compressor 60 will handle 170 pounds of air per minute, and will raise the pressure of this air from 5 atmospheres absolute to 30 atmospheres absolute. Of this 170 pounds per minute of air at a pressure of 30 atmospheres, and at a temperature of 300° K., which is all purified air, 79% (or 134.3 pounds per minute) will pass through the branch conduit 65'. The other 35.7 pounds per minute is conducted by conduit 66' to, and expanded in, expansion engine E-1 to a pressure of 5 atmospheres and a temperature of 210° K. Of the 134.3 pounds per minute which leaves exchanger 134 through the conduit 70', 45.6 pounds per minute (or 26.8% of the whole 170 pounds per minute) passes through the conduit 72' to the expansion engine E-2 and is expanded in the latter to a pressure of 5 atmospheres and a temperature of 150° K. It will therefore be understood that 88.7 pounds per minute of the pure air is passed through the conduit 71' into course 135B of heat exchanger 135 and is discharged from the latter through the conduit 77'. Of the 88.7 pounds discharged through the conduit 77', 68 pounds per minute is conducted by the conduit 78' to the expansion engine E-3 and expanded through the latter to a pressure of 5 atmospheres and a temperature of 103° K. The remaining 20.7 pounds per minute passes through the conduit 81' and the course 136B of heat exchanger 136 and is expanded through the pressure reducing valve 83 to a temperature of on the order of 100° K. and to a pressure of about 5½ atmospheres and passes into the separator 55.

Now it may be noted that from the conduit 150 there is conducted 27 pounds per minute of purified air at a temperature of 100° K. to the center course 133A of heat exchanger 133. This same quantity, or mass of air, may be passed in succession through the heat exchangers 133, 132 and 131, and be conducted by the conduit 161'B past the valve 157 to join the fluid flowing by way of the conduit 61'A towards the intake to the high pressure compressor unit as illustrated in Fig. 2, but preferably, as shown in Fig. 3, 5 pounds per minute of the 27 pounds which enters the lower end of the heat exchanger 133, may be conducted back by a conduit 161' to the conduit 74' through which purified air is flowing.

The quantity of nitrogen efflux is 126.3 pounds per minute, from which it will be noted, bearing in mind the fact that 143 pounds of raw air is supplied to the generator per minute, that slightly less than 17 pounds per minute of oxygen of desired purity is produced. It will be noted that the return circuit of purified air which terminates in the conduit 61'A is made up of 68 pounds per minute from the exhaust of the expansion engine E-3, 45.6 pounds per minute from the exhaust of expansion engine E-2, 35.7 pounds per minute from the exhaust of expansion engine E-1, and 20.7 pounds per minute taken from the separator 55, minus the quantity of pure air (27 pounds per minute) delivered through the conduit 61'B after passing through the central courses of the exchangers 133, 132 and 131. In the case of the embodiment of Fig. 3, it will be understood that 27 pounds may be initially taken into the reversing heat exchange system through the conduit 160, and 5 pounds per minute returned through the conduit 161'. It may be noted that proportions may be changed when desired by varying the adjustments of the valves 156 and 157.

With further respect to the embodiment of Fig. 3, it may be noted that adjustable valves 168 and 169 are respectively provided in the conduit 161" (corresponding to the conduit 161 of Fig. 2) and 161' leading to the conduit 74' to provide for the diversion of the 5 pounds per minute of liquefied air through the conduit 161' as above described.

The reason for passing more purified air through course 133A in exchanger 133 in Fig. 3 than through the corresponding courses in exchangers 132 and 131 is that the difference between the specific heats of the entering air stream and of the leaving nitrogen effluent is so large at the cold end of the exchanger series 131, 132 and 133 that more cooling from the purified air is desirable in exchanger 133 than is essential in the other two. It is possible to carry the 27 pounds per minute right through the three exchangers, but a more nearly perfect heat balance is accomplished with the arrangement of Fig. 3. With reference to the embodiments of Figs. 2 and 3, it will be observed in both cases that the heat exchangers for the cooling of the air in the pure air circuit are each bracketed by an expansion engine and accordingly the basic principle of the invention, from one of its aspects, is present in both of the structures disclosed in these two figures.

With respect to the embodiment of Fig. 2 it will be noted that the apparatus may be said to be constituted by an air separating circuit consisting of three main reversing heat exchangers, and a boiler condenser, a liquefier exchanger, and a single column, and of a secondary air circuit including a pump, three two-course heat exchangers, and an automatic pressure regulating valve; and there is a separation chamber common to both circuits. In the secondary air circuit, medium pressure air at say 30 atmospheres from the pump (60) just mentioned, is expanded at three temperature levels in expansion engines bracketing the two-course exchangers and a small quantity, about 12.2 per cent, of this medium pressure air is expanded in the automatic pressure regulating valve at the lowest temperature level. It may thus be said that the oxygen generator circuit is dual pressure with refrigeration supplied at four temperature levels. The primary air circuit is supplied with raw air at 5½ atmospheres, and separation of moisture and carbon dioxide is obtained in the reversing heat exchangers. The secondary air circuit contains purified primary air returned through the two-course heat exchangers at approximately 5 atmospheres, and this air is compressed in the air pump and returned at 30 atmospheres pressure, about 21 per cent of the 30 atmosphere air being expanded to 5 atmospheres in an expansion engine bracketing the first two-course heat exchanger, the discharge air passing back to the bracketed exchanger, and other expansion engines handle approximately 26.8 per cent and 40 per cent of the 30 atmosphere air and bracket the second and third two-course exchangers. The remaining 12.2 per cent of the high pressure air is expanded to 5½ atmospheres by means of an automatic pressure regulating valve. After passage through the three primary reversing exchangers, the low pressure air passes to a separation chamber common with the low pressure side of the high pressure circuit, then through the boiler-condenser in the base of the column, through the liquefier exchanger, through the liquefying valve and into the top of the column, and rectification is effected.

The mode of operation of the modified arrangement of Fig. 3 will be clear from what has been said with respect to its differences from that of Fig. 2, and the details given with respect to the embodiment of Fig. 2.

While there are in this application specifically described three forms which the invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. Method of separating oxygen from atmospheric air which includes passing compressed atmospheric air through a circuit including a column and a series of heat exchangers in heat exchange relation with nitrogen effluent from the column, providing necessary additional refrigeration in the heat exchangers by cooling purified air in a separate circuit and passing at least some of the cooled purified air through said several heat exchangers in the same direction as but in a separate path from the nitrogen effluent, and commingling the compressed atmospheric air and the cooled purified air in a chamber common to both circuits.

2. Method of providing auxiliary refrigeration for an oxygen generator in which entering air is passed at a pressure of a few atmospheres through reversing heat exchangers in heat exchange relation with leaving nitrogen effluent to a column in which oxygen is separated from the air, said method including passing through said heat exchangers an appropriate mass per unit of time of purified air at a pressure close to the pressure of the entering air and at a temperature in each of said exchangers slightly below the temperature of the entering air therein, said purified air cooled at least partially by expansion with external work of a plurality of portions thereof in successive expansion engines, the mass per unit of time of purified air being the same in each of said reversing exchangers.

3. Method of providing auxiliary refrigeration for an oxygen generator in which entering air is passed at a pressure of a few atmospheres through a circuit including reversing heat exchangers in heat exchange relation with leaving nitrogen effluent and a column in which oxygen is separated from the air, said method including passing through another circuit also including said heat exchangers an appropriate mass per unit of time of purified air at a pressure close to the pressure of the entering air and at a temperature in each of said exchangers slightly below the temperature of the entering air therein, said purified air cooled at least partially by expansion with external work of a plurality of portions thereof in successive expansion engines, the mass per unit of time of purified air being different in each of said reversing exchangers, and commingling the entering air and the purified air in a chamber common to both circuits.

4. Method of providing auxiliary refrigeration for an oxygen generator in which entering air is passed at a pressure of a few atmospheres through reversing heat exchangers in heat exchange relation with leaving nitrogen effluent to a column in which oxygen is separated from the air, said method including passing through said heat exchangers an appropriate mass per unit of time of purified air at a pressure close to the pressure of the entering air and at a temperature in each of said exchangers slightly below the temperature of the entering air therein, said purified air cooled at least partially by expansion with external work of a plurality of portions thereof in successive expansion engines, the mass per unit of time of purified air being the same in all but the first one of the reversing exchangers which it enters, and being larger in said first one than in the others.

5. A low temperature gas cycle refrigeration system, comprising a compressor having an intake and a discharge, a plurality of heat exchangers, a like number of expansion engines for the expansion of compressed gas with the performance of external work, conduit means for conducting a portion of the compressed gas from the compressor discharge through all of said heat exchangers in succession and other portions to each of said expansion engines, conduit means for conveying back to the compressor intake, through all of said heat exchangers, gas exhausted from one of said expansion engines and, in each case through one less heat exchanger, gas exhausted from the other expansion engines, a separating chamber containing cooled gas, means including a conduit and a pressure reducing valve for discharging from the last heat exchanger said compressed gas, at a reduced pressure into said chamber, and means for delivering to a device to be cooled, cooled gas at least in part drawn from said chamber.

6. A low temperature gas cycle refrigeration system, comprising a compressor having an intake and a discharge, a plurality of heat exchangers, a like number of expansion engines for the expansion of compressed gas with the performance of external work, conduit means for conducting a portion of the compressed gas from the compressor discharge through all of said heat exchangers in succession and other portions to each of said expansion engines, conduit means for conveying back to the compressor intake, through all of said heat exchangers, gas exhausted from one of said expansion engines and, in each case through one less heat exchanger, gas exhausted from the other expansion engines, a separating chamber containing cooled gas, means including a conduit and a pressure reducing valve for discharging from the last heat exchanger said compressed gas, at a reduced pressure into said chamber, and means for delivering to a device to be cooled, cooled gas drawn from said chamber.

7. Method of providing pure air for treatment in a fractionating apparatus from which liquid oxygen and a nitrogen efflux are delivered, including passing entering air and the nitrogen efflux in opposite direction through a plurality of reversing heat exchanger courses and delivering the entering air, freed of water vapor and carbon dioxide, to a separator chamber, providing further cooling, supplemental to that performed by the nitrogen efflux, through the progressive cooling of a stream of purified air in a parallel circuit through the successive expansions, with external work, of portions thereof and the cooling of the purified air by the expanded purified air and the bringing of said stream into heat exchange relation with the entering air, delivering a portion of the coldest of the purified air into the separator chamber, and delivering from the separator chamber to a fractionating apparatus an amount of the mixture therein substantially equal in mass per minute to the entering air.

8. Method of providing pure air for treatment in a fractionating apparatus from which liquid oxygen and a nitrogen efflux are delivered, including passing entering air and the nitrogen efflux in opposite directions through a plurality of reversing heat exchanger courses and delivering the entering air, freed of water vapor and carbon dioxide, to a separator chamber, providing further cooling, supplemental to that performed by the nitrogen efflux, through the progressive cooling of a stream of purified air in a parallel circuit through the successive expansions, with external work, of portions thereof and the cooling of the purified air by the expanded purified air and the passing of said stream through heat exchanger courses in heat exchange relation with said reversing heat exchanger courses, delivering a portion of the coldest of the purified air into the separator chamber, and delivering from the separator chamber to a fractionating apparatus an amount of the mixture therein substantially equal in mass per minute to the entering air.

9. In combination, a compressor having an intake and a discharge, a plurality of heat exchangers, a like number of expansion engines for the expansion of compressed gas with the performance of external work, conduit means for conducting a portion of the compressed gas from the compressor discharge through all of said heat exchangers in succession and other portions to each of said expansion engines, conduit means for conveying back to the compressor intake, through all of said heat exchangers, gas exhausted from one of said expansion engines and, in each case through one less heat exchanger, gas exhausted from the other expansion engines, a separating chamber containing purified gas, means including a conduit and a pressure reducing valve for discharging from the last heat exchanger said compressed gas, at a reduced pressure, into said chamber, another compressor, a plurality of reversing heat exchangers, equal in number to said first mentioned plurality, means for delivering from said second compressor compressed air through said reversing heat exchangers and to said separating chamber, a column including a boiler condenser, means for delivering to the latter a portion of the contents of said chamber, and means for delivering from said chamber fluid to one of said heat exchangers.

10. In combination, a compressor having an intake and a discharge, a plurality of heat exchangers, a like number of expansion engines for the expansion of compressed gas with the performance of external work, conduit means for conducting a portion of the compressed gas from the compressor discharge through all of said heat exchangers in succession and other portions to each of said expansion engines, conduit means for conveying back to the compressor intake, through all of said heat exchangers, gas exhausted from one of said expansion engines and, in each case through one less heat exchanger, gas exhausted from the other expansion engines, a separating chamber containing purified gas, means including a conduit and a pressure reducing valve for discharging from the last heat exchanger said compressed gas, at a reduced pressure, into said chamber, another compressor, a plurality of reversing heat exchangers, equal in number to said first mentioned plurality, means for delivering from said second compressor compressed air through said reversing heat exchangers and to said separating chamber, a column including a boiler condenser, means for delivering to the latter a portion of the contents of said chamber, and means for delivering from said chamber fluid to one of said reversing heat exchangers.

11. In combination, a compressor having an intake and a discharge, a plurality of pairs of heat exchanger courses, expansion engines equal in number to said pairs for the expansion of compressed gas with performance of external work, conduit means for conducting a portion of the compressor discharge compressed gas from the compressor discharge through one course of each of said heat exchanger pairs in succession and other portions to each of said expansion engines, conduit means for leading back to the compressor intake through the other courses of each of said pairs gas exhausted from one of said expansion engines and, in each case through one less course, gas exhausted from the other expansion engines, a separating chamber containing purified gas, means including a conduit and a pressure reducing valve for discharging from the last of said first mentioned courses said compressed gas at a reduced pressure into said chamber, another compressor, a plurality of pairs of reversing heat exchanger courses equal in number to the first mentioned number of pairs, means for delivering from said second compressor compressed air in turn through said series of reversing courses to said separating chamber, a column including a boiler condenser, means for delivering to the latter a portion of the contents of said chamber and means for delivering from said chamber fluid into heat exchange relation with said reversing courses.

12. A low temperature gas cycle refrigeration system comprising a compressor, a plurality of heat exchangers, a plurality of expansion engines for the expansion of compressed gas with the performance of external work, conduit means for conducting a portion of the compressed gas from the compressor through a plurality of said heat exchangers in succession and to one of said expansion engines, conduit means for conducting further portions of said compressed gas from at least one point prior to its passage through the last of said successive heat exchangers to further of said expansion engines, and conduit means for conducting expanded gas from said further expansion engines through said heat exchangers to said compressor counter-current to the flow of said compressed gas, conduit means for conducting cold purified gas to a space to be cooled, and conduit means for conveying the gas from the space to be cooled to the compressor independently of all of said heat exchangers.

13. A low temperature gas cycle refrigeration system, comprising a compressor, a plurality of heat exchangers, a like number of expansion engines for the expansion of compressed gas with the performance of external work, conduit means for conveying progressively diminishing portions of the compressed gas from the compressor through said heat exchangers in succession, conduit means for conveying a further portion of said compressed gas from said compressor to one of said expansion engines, conduit means for conveying the expanded gas from said first engine to said compressor through the first heat exchanger counter-current to the flow of the compressed gas therethrough, conduit means for conveying a portion of the compressed gas leaving said first heat exchanger to the second of said expansion engines, conduit means for conveying expanded gas from said second engine through all but the last of said heat exchangers counter-current and in inverse order to the flow of said compressed gas, conduit means for conveying the remaining portion of the compressed gas from the second of said heat exchangers in part to the third of said expansion engines and in part to the last of said heat exchangers, conduit means for conveying cooled gas to a space to be cooled, and conduit means for conveying the gas from the cooled space to the compressor independently of all of said heat exchangers.

14. A low temperature gas cycle refrigeration system comprising a compressor, a heat exchanger, an expansion engine for the expansion of compressed gas with performance of external work, a second heat exchanger, a second expansion engine for the expansion of compressed gas with performance of external work, conduit means for conveying a portion of the compressed gas from the compressor through said first heat exchanger to said first expansion engine, conduit means for conveying expanded gas from said first expansion engine through said first heat exchanger counter-current to the flow of compressed gas therethrough, conduit means, including a portion common to it and to said first conduit means, for conveying a further portion of the compressed gas successively through said first and second heat exchangers to said second expansion engine, conduit means for conveying expanded gas from said second expansion engine through a space to be cooled and thereafter independently of said second and said first heat exchangers to the compressor.

15. Apparatus for the removal condensable impurities from a gaseous stream to be separated by rectification including three three-course heat exchangers each containing a pair of courses traversed in turn by the entering gaseous stream and by an effluent from a column, and a third course for a purified gas stream, means for reducing, by expansion with the performance of external work of successive portions thereof, the temperature of a purified stream of gas, and means for passing a uniform quantity of purified gas through each of said third courses in counterflow relation to the entering gaseous stream.

16. Method of producing substantially pure oxygen from atmospheric air including compressing air continuously to on the order of 5½ atmospheres absolute and passing the same in a steady flow through two courses, in alternation, of a series of reversing heat exchangers in counterflow relation to a stream of nitrogen effluent, and delivering the air, purified and cooled, into a chamber constituting a source for the delivery of purified air in at least substantially like mass per minute to the boiler of a fractionating column, pumping purified air from a pressure of on the order of 5 atmospheres absolute to a pressure of on the order of 30 atmospheres absolute, and forcing such purified air, 79 per cent into a third heat exchanger course and 21 per cent to the intake of an expansion engine which discharges air at 5 atmospheres absolute to a fourth heat exchanger course, and through the latter, in counterflow relation to the air in said third course, to cool such air, and for recompression to 30 atmospheres; dividing the purified air stream leaving the third heat exchanger course and conducting on the order of 52 per cent of the total stream of purified air to a fifth heat exchanger course and on the order of 27 per cent of the total stream of purified air to another expansion engine, conducting the last mentioned portion, after expansion thereof, through a sixth heat exchanger course in heat exchange relation with the fifth course and counterflow to the air in the latter, and delivering the air from the sixth course, into the exhaust line from the first expansion engine to the fourth course, dividing the cooled air from the fifth course and passing a part thereof equal to on the order of 12 per cent of the total stream of purified air to a seventh heat exchanger course and another portion thereof through a third expansion engine and passing the exhaust of said engine, in counterflow relation to the air flow in said seventh course, to an eighth heat exchanger course and from the latter to join the exhaust of the second expansion engine, delivering the cold air from the seventh course through a pressure reducing valve to a chamber, delivering from said chamber a mass of air per minute at least substantially equal to that delivered to it at on the order of 5½ atmospheres, to a boiler coil in a rectifying column, delivering the purified liquid air from the latter to one course of still another exchanger, and, after leaving the latter and a reduction of the pressure of the air to on the order of 1½ atmospheres absolute, delivering it into the column, and there being taken from such mixture in said chamber and delivered to a heat exchanger course in heat exchange relation with said first mentioned reversing courses, and passed in said course in counterflow relation to the entering air, cold purified air sufficient to provide the necessary supplement to the refrigeration provided by the nitrogen effluent.

17. A method of providing auxiliary refrigeration for an oxygen generator in which entering air carrying impurities is passed at a pressure of a few atmospheres through reversing heat exchangers in heat exchange relation with leaving nitrogen effluent to a column in which oxygen is separated from the air, said method including passing through said heat exchangers an appropriate mass per unit of time of gas free from said impurities at a pressure close to the pressure of the entering air and at a temperature in each of said exchangers slightly below the temperature of the entering air therein, said impurity-free gas being cooled at least partially by expansion with external work of a plurality of portions thereof in successive expansion engines, the mass per unit of time of impurity-free gas being the same in all but the first one of the reversing exchangers which it enters, and being larger in said first one than in the others.

18. In an oxygen generator having a source of compressed air, a rectification column, a secondary compressor, a plurality of heat exchangers having a plurality of fluid flow passages, and a plurality of expansion engines, and providing a primary circuit and a secondary circuit having direct fluid communication at one point, the improvement comprising means to conduct compressed air from the source to the column including some of said passages connected in series, means to conduct waste gas effluent from the column to the atmosphere including other of said passages connected in series, reversing valve means for said some and said other passages, said some and said other passages being in heat interchange relation with each other and forming part of the primary circuit, means to connect the secondary compressor discharge with the expansion engines including a third group of said passages, and means to connect the expansion engines with the secondary compressor intake including a fourth group of said passages, said third and fourth groups of passages forming part of the secondary circuit and being in heat exchange relation at least with each other.

19. In an oxygen generating system providing a primary circuit and a secondary circuit having direct fluid communication at a point of the system common to both circuits and having a source of compressed air, a rectification column, a secondary compressor having an intake and a discharge, a plurality of heat exchangers having a plurality of fluid flow passages, and means to convert compressed gas to expanded gas including a plurality of expansion engines, the improvement comprising means to conduct compressed air from the source to the column including some of said passages connected in series and constituting a first group, means to conduct waste gas effluent from the column to the atmosphere including other of said passages connected in series and constituting a second group, reversing valve means to interchange the passages of the two groups, the passages of the first group being in heat exchange relation with the passages of the second group and forming part of the primary circuit, means to conduct compressed gas from the secondary compressor to the expansion engines including a third group of said passages, and means to conduct expanded gas in heat exchange with compressed gas and in heat exchange with the first and second groups of passages to the secondary compressor intake, said expanded gas conducting means constituting a fourth group of the plurality of fluid flow passages, and said third and fourth groups of passages forming part of the secondary circuit.

20. Method of separating oxygen from atmospheric air which includes passing compressed atmospheric air en route to a column through a series of heat exchangers in heat exchange relation with nitrogen effluent from the column, providing necessary additional refrigeration in the heat exchangers by cooling purified air in a separate circuit and passing at least some of the cooled purified air through said several heat exchangers in the same direction as but in a separate path from the nitrogen effluent, delivering air purified and cooled in said exchangers to a separating chamber located in the path of flow between the heat exchangers and the column for mixture therein with previously purified air, passing to the column a mass of the mixture per unit of time equal to the mass per unit of time of the purified atmospheric air delivered to said chamber, and passing to the cooled purified air which passes through the heat exchangers in the same direction as the nitrogen effluent a mass of the mixture per unit of time equal to the mass per unit of time of purified air which is delivered to said chamber.

21. A method of separating one constituent from a mixture of gases which includes passing a mixture of the gases en route to a column through a series of heat exchangers in heat exchange relation with a lower boiling point effluent from the column, to remove condensable impurities and cool the mixture, providing necessary additional refrigeration for said heat exchangers by cooling a stream of the mixture freed from said condensable impurities and passing at least a part of such cooled stream through said heat exchangers in the same direction as but in a separate path from such efflux from the column, continuously removing a portion of said cooled stream for treatment in the column, and replacing the removed portion by a like quantity per unit of time of the purified mixture.

SAMUEL C. COLLINS.

References Cited in the file of this patent

UNITED STATES PATENTS

| Number | Name | Date |
|---|---|---|
| 1,626,345 | Rogue | Apr. 26, 1927 |
| 2,002,940 | Frankl | May 28, 1935 |
| 2,041,725 | Podbielniak | May 26, 1936 |
| 2,458,894 | Collins | Jan. 11, 1949 |
| 2,460,859 | Trumpler | Feb. 8, 1949 |
| 2,509,034 | Claitor et al. | May 23, 1950 |
| 2,541,409 | Cornelius | Feb. 13, 1951 |
| 2,562,812 | Orgorzaly | July 31, 1951 |
| 2,579,498 | Jenny | Dec. 25, 1951 |